United States Patent
Kabbani et al.

(10) Patent No.: US 9,288,146 B1
(45) Date of Patent: Mar. 15, 2016

(54) REDUCING BATCH COMPLETION TIME IN A COMPUTER NETWORK WITH PER-DESTINATION MAX-MIN FAIRNESS

(71) Applicant: Google Inc., Mountain View, CA (US)

(72) Inventors: Abdul Kabbani, Los Gatos, CA (US); Amin Vahdat, Los Altos, CA (US)

(73) Assignee: Google Inc., Mountain View, CA (US)

(*) Notice: Subject to any disclaimer, the term of this patent is extended or adjusted under 35 U.S.C. 154(b) by 154 days.

(21) Appl. No.: 13/903,676

(22) Filed: May 28, 2013

(51) Int. Cl.
*G06F 15/16* (2006.01)
*H04L 12/801* (2013.01)

(52) U.S. Cl.
CPC .................................... *H04L 47/10* (2013.01)

(58) Field of Classification Search
CPC ....... H04L 12/56; H04L 12/721; H04L 12/26; H04L 47/528; H04L 12/24; G06F 15/16; G06F 9/455
USPC ................. 370/230–235, 392; 718/1; 705/34; 717/174
See application file for complete search history.

(56) References Cited

U.S. PATENT DOCUMENTS

| 2011/0296052 | A1* | 12/2011 | Guo et al. ..................... 709/240 |
| 2013/0003538 | A1* | 1/2013 | Greenberg et al. ............ 370/230 |
| 2014/0092726 | A1* | 4/2014 | Khan et al. .................... 370/221 |

FOREIGN PATENT DOCUMENTS

WO  WO 2014021839 A1 * 2/2014

* cited by examiner

*Primary Examiner* — Charles C Jiang
*Assistant Examiner* — Wali Butt
(74) *Attorney, Agent, or Firm* — Edward A. Gordon; Foley & Lardner LLP (57) ABSTRACT

The present disclosure describes a system and method for reducing total batch completion time using a per-destination max-min fairness scheme. In a distributed computer system, worker nodes often simultaneously return responses to a server node. In some distributed computer systems, multiple batches can traverse a network at any one given time. The nodes of the network are often unaware of the batches other nodes are sending through the network. Accordingly, in some implementations, the different batches encounter different effective path capacities as nodes send flows through links that are or become bottlenecked. The per-destination max-min fairness scheme described herein reduces the total batch completion time by collectively routing the batches in a way that targets providing substantially uniform transmission times without under underutilizing the network.

20 Claims, 8 Drawing Sheets

*Figure 5C*

REDUCING BATCH COMPLETION TIME IN A COMPUTER NETWORK WITH PER-DESTINATION MAX-MIN FAIRNESS

BACKGROUND

Many data center applications are based on a many-to-one communication pattern. The many-to-one communication pattern may be implemented with distributed storage and computation frameworks. In this pattern, a server issues a request for data to a plurality of worker nodes. The server often waits for responses from all of the worker nodes before proceeding to a new process. The server's wait for the plurality of responses often means the total completion time of the request (i.e., the length of time from the issuance of the request until the server can proceed to the next process) is dictated by the slowest worker node.

SUMMARY OF THE DISCLOSURE

Aspects and implementations of the present disclosure are directed to systems and methods for achieving increased bandwidth usage and approaching max-min fairness of flow rates in a computer network.

According to one aspect of the disclosure a system for determining routes for data flows across a network includes a memory to store processor-executable instructions, and a processing unit coupled to the memory. Execution of the processor-executable instructions by the processing unit causes the processing unit to receive a network topology of a plurality of data links that connect a plurality of source nodes to a plurality of second level nodes. The processing unit also determines a proportion of data to traverse the network. The processor-executable instructions further cause the processor to maintain a corresponding virtual link for each of the data links in the network, and to determine an initial throughput allocation for each of the virtual links. Then, the processor-executable instructions cause the processor to iteratively identify a subset of the plurality of second level nodes having additional capacity, and then increase the bandwidth capacity to the virtual links corresponding to the identified subset of the plurality of second level nodes. The iterative process exits when all of the second level nodes are fully utilized. After the iterative process is complete, the processing unit implements an amount of data to traverse each of the plurality of data links responsive to a proportion of the data allocated to each of the respective virtual links.

According to another aspect of the disclosure, a computer-implemented method for determining routes for data flows across a network includes receiving a network topology of a plurality of data links that connect a plurality of source nodes to a plurality of second level. The method also includes determining a proportion of data to traverse the network. The method further includes maintaining a corresponding virtual link for each of the data links in the network, and determining an initial throughput allocation for each of the virtual links. The method includes iteratively identifying a subset of the plurality of second level nodes having additional capacity, and then increasing the bandwidth capacity to the virtual links corresponding to the identified subset of the plurality of second level nodes. The iterative process exits when all of the second level nodes are fully utilized. After the iterative process is complete, the method includes implementing an amount of data to traverse each of the plurality of data links responsive to a proportion of the data allocated to each of the respective virtual links.

According to yet another aspect of the disclosure, a non-transitory computer readable storage medium having instructions encoded thereon which, when executed by a processor, cause the processor to perform a method for determining routes for data flows across a network. The method includes receiving a network topology of a plurality of data links that connect a plurality of source nodes to a plurality of second level nodes. The method also includes determining a proportion of data to traverse the network. The method further includes maintaining a corresponding virtual link for each of the data links in the network, and determining an initial throughput allocation for each of the virtual links. The method includes iteratively identifying a subset of the plurality of second level nodes having additional capacity, and then increasing the bandwidth capacity to the virtual links corresponding to the identified subset of the plurality of second level nodes. The iterative process exits when all of the second level nodes are fully utilized. After the iterative process is complete, the method includes implementing an amount of data to traverse each of the plurality of data links responsive to a proportion of the data allocated to each of the respective virtual links.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DESCRIPTION OF CERTAIN ILLUSTRATIVE IMPLEMENTATIONS

Following below are more detailed descriptions of various concepts related to, and implementations of, the various concepts introduced above and discussed in greater detail below. The concepts may be implemented in any of numerous ways, as the described concepts are not limited to any particular manner of implementation. Examples of specific implementations and applications are provided primarily for illustrative purposes.

The present disclosure describes a system and method for reducing total batch completion time using a per-destination max-min fairness scheme. In a distributed computer system, worker nodes often simultaneously return responses to a server node. The responses from all the worker nodes to the server node may be referred to as a batch. In some distributed computer systems, multiple batches can traverse a network at any one given time. The nodes of the network are often unaware of the batches other nodes are sending through the network. Accordingly, in some implementations, the different batches encounter different effective path capacities as nodes send flows through links that are or become bottlenecked. The per-destination max-min fairness scheme described herein reduces the total batch completion time by collectively routing the batches in a way that targets providing substantially uniform transmission times without under underutilizing the network.

Figure 1:
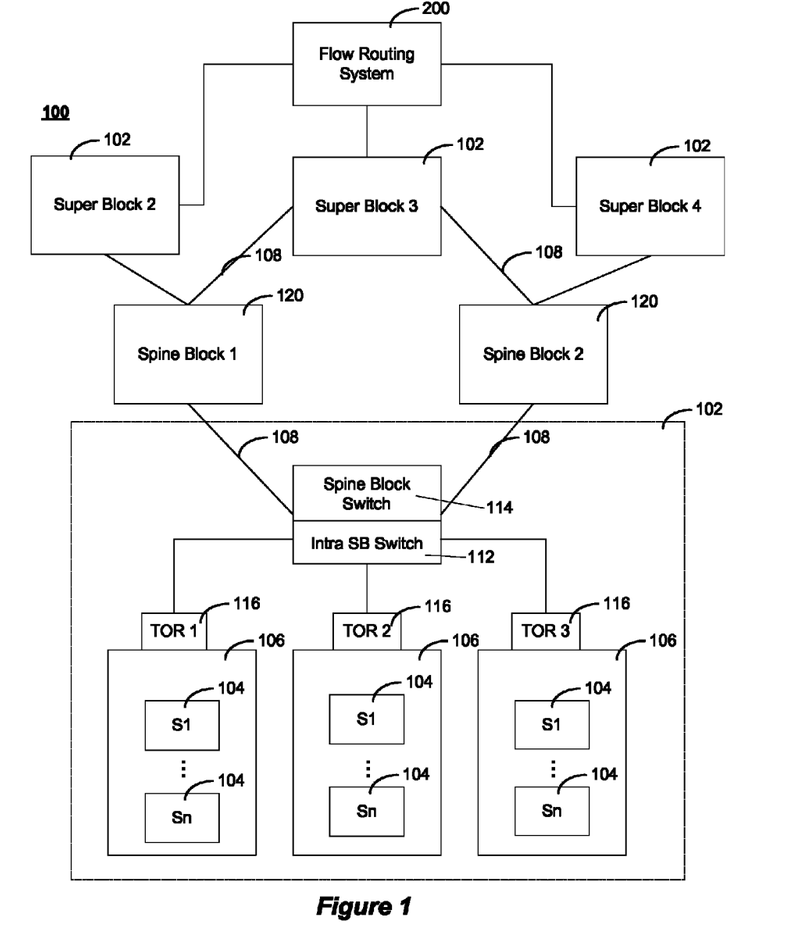
FIG. 1 is a diagram of a data center, according to an illustrative implementation.

FIG. 1 is a block diagram of an example data center 100. The data center 100 includes several interconnected superblocks 102 (also referred to as "pods"). Each superblock 102 may include many hundred, and in some implementations over one thousand, servers 104 arranged in server racks 106. The superblocks 102 are communicatively coupled to one another by optical and/or electrical communication links 108. They can be connected directly, or through spineblocks 120, which serve as switches for routing data communications between the superblocks 102. A flow routing system 200 controls the distribution of flows (also referred to as forwarding weights) a superblock 102 transmits to each of the spineblocks 120. The superblock 102 includes an intra-superblock switch 112 for routing communications among the racks 106 included in the superblock 102 or to a spineblock switch 114, which routes data communications between superblocks 102 through spineblocks 120. In some implementations, the spineblock switch 114 can be a spineblock or it can be switch within the superblock 102.

As indicated above, each superblock 102 includes a large number of servers 104. In some implementations, a superblock 102 may include hundreds or more than one thousand servers. The servers 104 are arranged in server racks 106. A top-of-rack switch 116 routes data communications between servers 104 within a given rack 106 and from servers within the rack to the intra-superblock switch 112.

In some implementations, the data center 100 employs multi-path routing. Multi-path routing is described further in relation to FIG. 2, but briefly, multi-path routing involves distributing the flows traversing the network from a first superblock 102 to a second superblock 102 across multiple paths. For example, in some implementations, each superblock 102 is connected to a plurality of spineblocks 120. In this example, when a first superblock 102 transmits flows to a second superblock 102, the first superblock distributes specific percentages of its flows to each of the multiple spineblocks 120. The multiple spineblocks 120 then forward the flows to the second superblock 102. In some implementations, multi-path routing is a form of load balancing. The flow routing system 200 determines the percentage of flows the first superblock 102 sends to each of the spineblocks 120. The percentage of a superblock's 102 total number of flows that the superblock 102 transmits to each spineblock 120 is called a forwarding weight. The forwarding weight corresponds to the relative amount of data a superblock 102 transmits to the spineblock 120. For example, a superblock 102 may transmit 30% of its data to a first spineblock 120, 20% to a second spineblock 120, and 50% to a third spineblock 120. In this example, the forwarding weights to the first, second, and third spineblocks 120 are 0.20, 0.30, and 0.50, respectively. In some implementations, the flow routing system 200 sets rate limiters in the switches (e.g., the spineblock switch 114) of the data center 100 to control the percentage of flows that are forwarded to each of the spineblocks 120. In some implementations the percentage of flows forwarded to a spineblock 120 is also referred to as a forwarding weight. In other implementations, the flow routing system 200 instructs routers or switches at each node (e.g., superblock 102) to select routes for data packets based on the forwarding weights.

The flow routing system 200 is implemented by special purpose logic circuitry (e.g., a FPGA (field programmable gate array) or an ASIC (application-specific integrated circuit)) and/or a general purpose computing device. The flow routing system 200 can also include, in addition to hardware, code stored on a computer readable medium that, when executed, causes the flow routing system 200 to perform one or more of the methods described herein.

Figure 2:
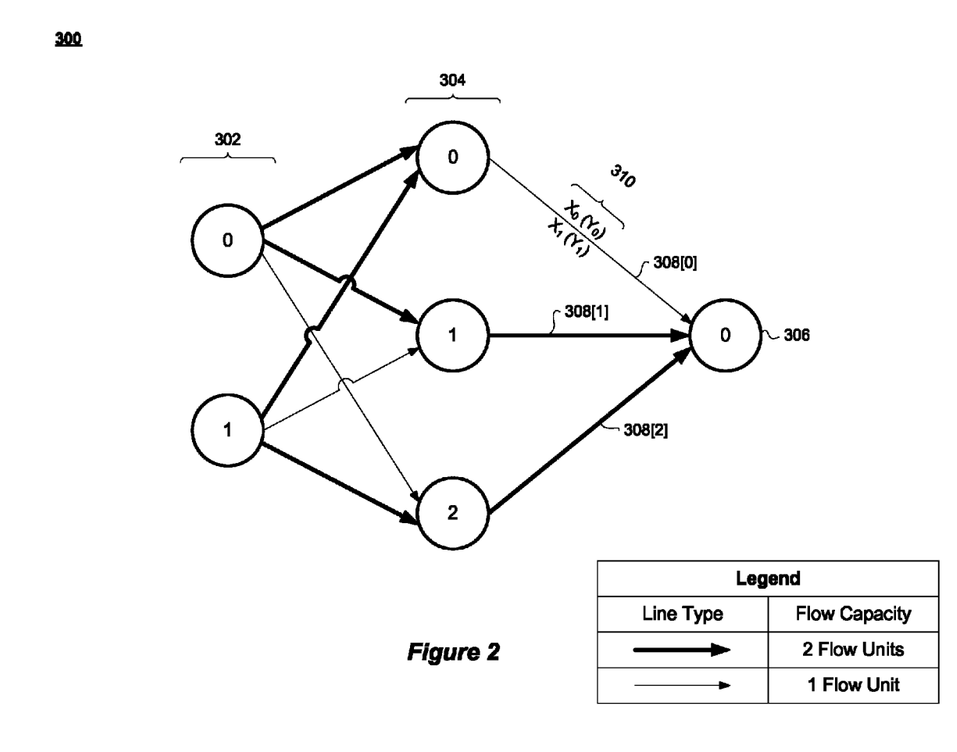
FIG. 2 is a block diagram of a network, according to an illustrative implementation.

FIG. 2 is a distributed computer network 300, according to an illustrative implementation. The network 300 includes a plurality of node types, including source nodes 302[0-1], switches 304[0-2], and a destination node 306. The nodes of the network 300 are coupled to one another through communication links 308 (also referred to simply as links). The flow routing system 200 (not depicted in network 300) controls the relative amount of data each of the source nodes 302[0-1] transmits to each of the switches 304[0-2] by setting the forwarding weight from each of the source nodes 302 [0-1] to the switches 304[0-2].

In some implementations, the source nodes 302[0-1] and destination node 306 are the above described superblocks 102. For example, the source nodes 302[0-1] are two superblocks 102 returning requested data to the destination node 306, a third superblock 102. In some implementations, the source nodes 302 [0-1] and the destination node 306 reside within the same data center and in other implementations the different components of the network 300 are housed in separate locations and linked through a network.

In some implementations, the switches 304[0-2] are the above described spineblocks 120. In other implementations, the switches 304[0-2] are any type of networking switches, such as, but not limited to the spineblock switch 114 or other hierarchical switches. The switches 304[0-2] are configured to accept data from the source nodes 302[0-1] and route the data to the destination node 306.

In some implementations, the links 308 are the above described communication links 108 between superblocks 102 and spineblocks 120, as showing in FIG. 1. Each link 308 has a physical and/or logical data capacity and data throughput 310. For illustrative purposes, in the network 300, the links 308 depicted by the thicker lines have a capacity of two flow units and the links 308 depicted by thinner lines have a capacity of one flow unit. In some implementations, a flow unit is a number of flows greater than or equal to one. In other implementations, a flow unit is an amount of data associated with one or more flows.

The data throughput 310 illustrates the nomenclature used throughout the disclosure to describe the data throughput 310 of a link 308. The throughput 310 includes a first throughput label above the link 308 (i.e., $X_0(Y_0)$) and a second throughput label below the link 308 (i.e., $X_1(Y_1)$). As used in reference to the examples herein, the throughput label above the link 308 is associated with source node 302[0], and the throughput label below the link 308 is associated with the source node 302[1]. Generally, a link's throughput 310 from a source node 302[n] is represented as $X_n$ ($Y_n$), where $X_n$ indicates an attempted throughput over the link 308 from the source node 302 [n], and $Y_n$ indicates the realized throughput over the link 308 from the source node 302[n]. The realized throughput, is the throughput that is achieved in response to bottlenecks or other network 300 congestion. For example, if source node 302 [0] transmits one flow unit to switch 304[0] and source node 302[1] also transmits one flow unit to switch 304[0] then $X_1=X_2=1$. As indicated by the thin line, the link 308 between the switch 304[0] and the destination node 306 has a capacity of only 1 flow unit. The link 308, therefore, cannot accommodate the two flow units the source nodes 302[0-1] are attempting to flow over the link 308. The two source nodes 302 [0-1] equally share the link's throughput, and therefore a bottleneck occurs. Responsive to the bottleneck, the realized throughput from each source nodes 302 [0-1] is only 0.5 flow units (i.e., $Y_1=Y_2=0.5$).

One of ordinary skill in the art will recognize the above described network 300 is provided for illustrative purposes and in no way is intended to limit the scope of the disclosure. For example, the network 300 may include any number of source nodes 302, switches 304, and destination nodes 306. In some implementations, the network 300 can include multiple layers of switches 304 or other node types between a source node(s) 302 and destination node 306. Furthermore, the methods described herein are applicable to any of the above described variations of network 300.

As described above, the network 300 is configured to support multi-path routing. For example, when the source node 302[0] sends data to destination node 306[0], the source node 302[0] transmits a predetermined percentage of its total data (or percentage of flows flows) to each of the switches 304[0-2]. The switches 304[0-2] then forward the data to the destination node 306[0]. In network 300 there are three paths from source node 302[0] to destination node 306[0]. In some implementations, multi-path routing is used as a form of load balancing.

In some implementations, the network 300 and data center 100 are used for network distributed storage and computation. Map-Reduce, Hadoop, and Cassandra are example implementations of distributed storage and computation frameworks. When performing distributed computations, a server issues a request to a plurality of worker nodes. In some implementations, the server and worker nodes are superblocks 102 in the data center 100. After calculating or retrieving the data, the worker nodes (the source nodes 302[0-1] in network 300) transmit the results back to the server node (the destination node 306 in network 300). In some implementations, the server waits for a substantial portion of the responses from the worker nodes to be returned before beginning a new process. Accordingly, process completion time (also referred to as batch completion time) is dependent on the substantially slowest responses returned to the server node. In some implementations, the flow routing system 200 attempts to provide a substantially uniform response transmission time by reducing the time variance of the individual responses as they traverse the network 300. In some implementations, such as those when the network 300 is employing multi-path routing, the worker node responses encounter different effective path capacities because a plurality of worker nodes transmit responses over the network 300 at any given time. For example, a worker node may transmit a response across a path that is currently experiencing a bottleneck. Responses traversing the bottlenecked path experience diminished path capacities and therefore have slower response times.

In some implementations, the flow routing system 200 provides a substantially uniform transmission time and reduces batch completion time by increasing (and in some implementations maximizing) each source node's 302 throughput to the destination node 306. The method for increasing throughput to a destination node 306 is described further in relation to FIG. 4.

Figure 3A:
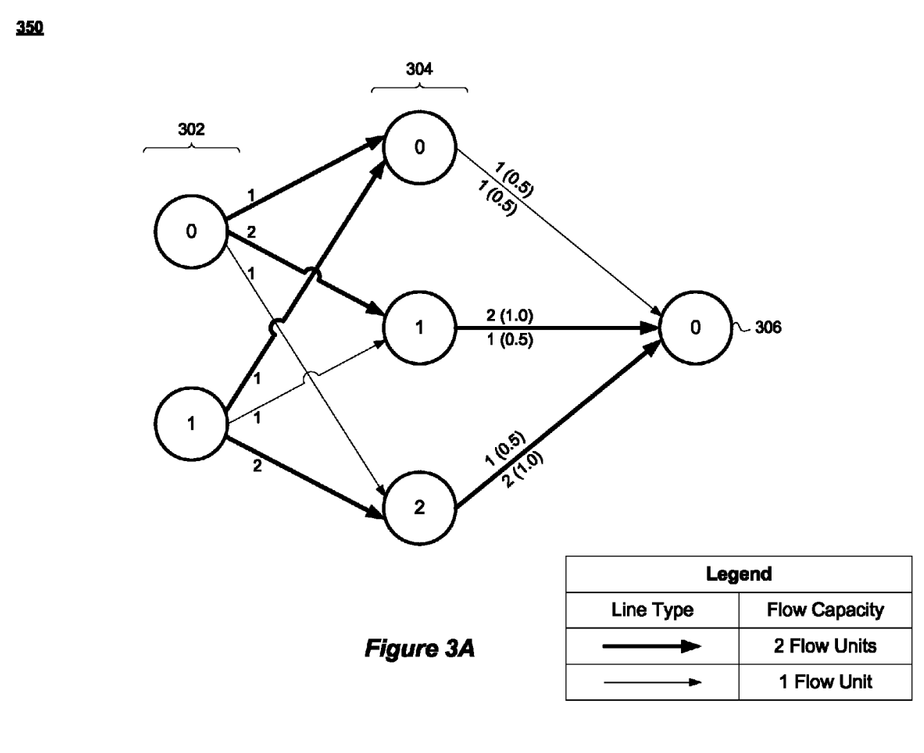
FIGS. 3A and 3B are network topologies of the network of FIG. 2 and include example forwarding weights, according to an illustrative implementation.

FIG. 3A illustrates a network 350. The network 350 is the network 300 after the flow routing system 200 has assigned forwarding weights to each of the links 308. In network 350, the throughput from each of the source nodes 302 [0-1] is independently maximized. That is, the forwarding weights for each source nodes 302[0-1] have been set as if that source node 302[0] or 301[1] is the only source node 302 in the network 350. In this example, 25% of a source node's 302 total flows is equal to one flow unit. Substantially maximizing the throughput of the source node 302[0] to destination node 306 results from the source node 302[0] sending 25% of its traffic to switch 304[0], 50% of its traffic to switch 304[1], and 25% of its traffic to switch 304[2]. As 25% of a source node's 302 traffic is equal to 1 flow unit in this example, source node 302 [0] sends 1 flow unit to switch 304[0], 2 flow units to switch 304[1], and 1 flow unit to switch 304[2]. Similarly, in the network 350, source node 302[1] sends 25% of its flows to switch 304[0], 25% of its flows to switch 304[1], and 50% of its flows to switch 304[2]. In this example, the forwarding weights substantially maximizes each source node's 302 throughput to the destination node 306, but only when one source nodes 302[0] or 302[1] is transmitting flows through the network 350. However, setting a source node's 302 forwarding weights independent of the other source nodes 302 may fail to substantially maximize the aggregate throughput from collective set of source nodes 302[0-1], for example, when the source nodes 302[0-1] have backlogged demands that are simultaneously destined for destination node 306.

Illustrating the failure to substantially maximize the aggregate network throughput, when each of the source nodes 302 [0-1] simultaneously sends traffic to the destination node 306 bottlenecks occur at each of the links 308 between the switches 304[0-2] and destination node 306. The bottlenecks occur because the traffic from each of the source nodes 302 [0-1] share the network's 350 total bandwidth capacity. Sharing the bandwidth of each link 308 translates into about half of each link's 308 bandwidth being dedicated to traffic originating from each of the source nodes 302[0-1]. As illustrated by network 350, the total realized throughput (i.e., the combined realized throughput from source nodes 302[0-1]) from switch 304[0] to the destination node 306 is 1 flow unit, the realized throughput from switch 304[1] to the destination node 306 is 1.5 flow units, and the realized throughput from the switch 304[1] to the destination node 306 is 1.5 flow units. Summing these realized throughputs, the total throughput to the destination node 306 is 4 flow units. However, the total capacity of the links 308 between the switches 304[0-2] and the destination node 306 is 5 flow units. Accordingly, the network 300 is only using 80% (4 flow units/5 flow units) of its throughput capacity.

In some implementations, to increase a network's 300 use of its total throughput capacity, the flow routing system 200, employs a per-destination max-min fairness scheme. In this scheme, a throughput allocation is deemed fair if all source nodes 302 cannot increase their respective throughputs towards a given destination node 306 without decreasing the throughput of a another source node 302 whose throughput is less than or equal to the first source node 302.

In some implementations, the per-destination max-min fairness scheme may provide substantially the same bandwidth experience for all flows traversing the network 300 and may increase throughput utilization towards the destination node 306. Accordingly, the scheme may allow for substantially uniform transmission times of flows traversing the network 300 and reduced a batch's overall completion time.

Figure 3B:
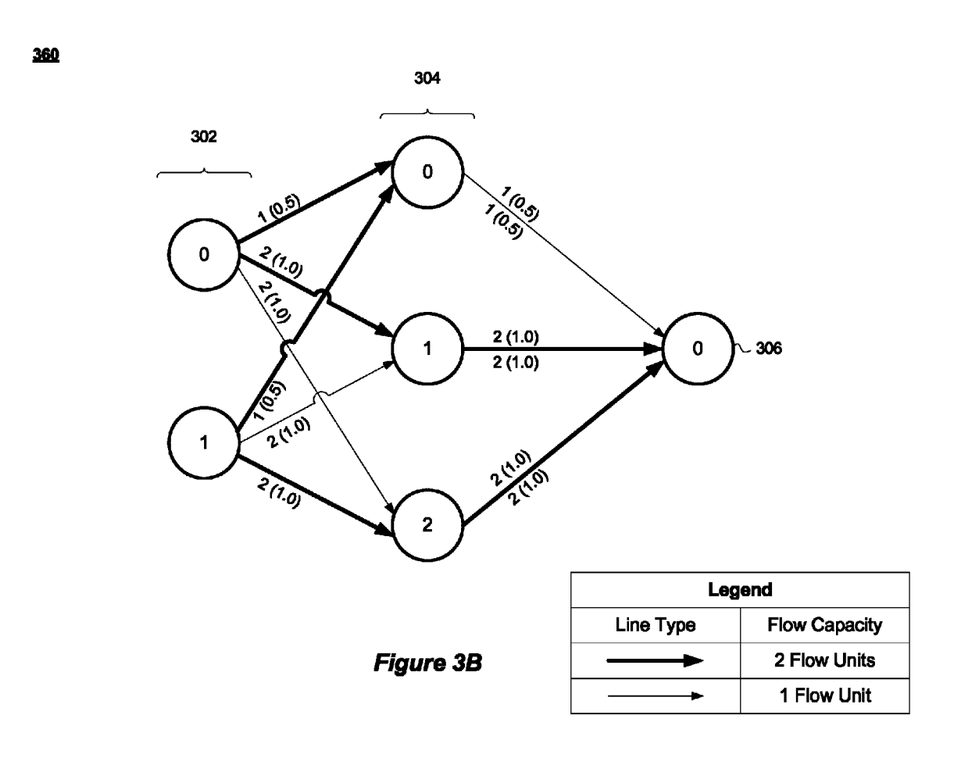

FIG. 3B illustrates network 360, which corresponds to the network 300 when the forwarding weights from each of the source nodes 302[0-1] have been set using a per-destination max-min fairness scheme. In this example, for illustrative purposes, 20% of a source node's 302 total number of flows (or 20% of its aggregate data transmissions) is considered equal to one flow unit. As illustrated by network 360, source node 302[0] sends 20% of its flows to switch 304[0], 40% of its flows to switch 304[1], and 40% of its flows to switch 304[2]. The source node 302[1] sends 20% of its flows to switch 304[0], 40% of its flows to switch 304[1], and 40% of its flows to switch 304[2]. This combination of forwarding weights creates a backlog of data at each of the switches 304[0-2]. Each of the source nodes 302[0-1] are attempting to transmit 1 flow unit across the link 308 between the switch 304[0] and the destination node 306, 2 flow units across the link 308 between the switch 304[1] and the destination node 306, and 2 flow units across the link 308 between the switch 304[2] and the destination node 306. As the flows from each of the source nodes 302[0-1] are provided with half of the link's 308 capacity, 1 total flow unit traverses link 308[0], 2 total flow units traverse link 308[1], and 2 total flow units traverse link 308[2]. The total throughput to the destination node 306 is 5 flow units, the same as the capacity, and thus the network 360 is using 100% of its possible throughput capacity.

In some implementations, each forwarding weight under the per-destination max-min fairness scheme is calculated using linear programming. As described further in relation to FIG. 4, in some other implementations, the flow routing system 200 uses a heuristic to calculate forwarding weights that substantially approximate the optimal results that may be achieved using linear programming.

In some implementations, the heuristic works by initially allocating bandwidth to each of the paths of the network 300 from the source nodes 302 [0-1] to the destination node 306. The allocation to each of the paths is made iteratively, responsive to the max-flow min-cut algorithm. The max-flow min-cut algorithm is described below in relation to FIG. 4. After an allocation, any nodes in the network 300 that are left unsaturated (i.e., the bandwidth allocated to the flows traversing the node can be increased) are allocated additional flows or transmitted data.

Figure 4:
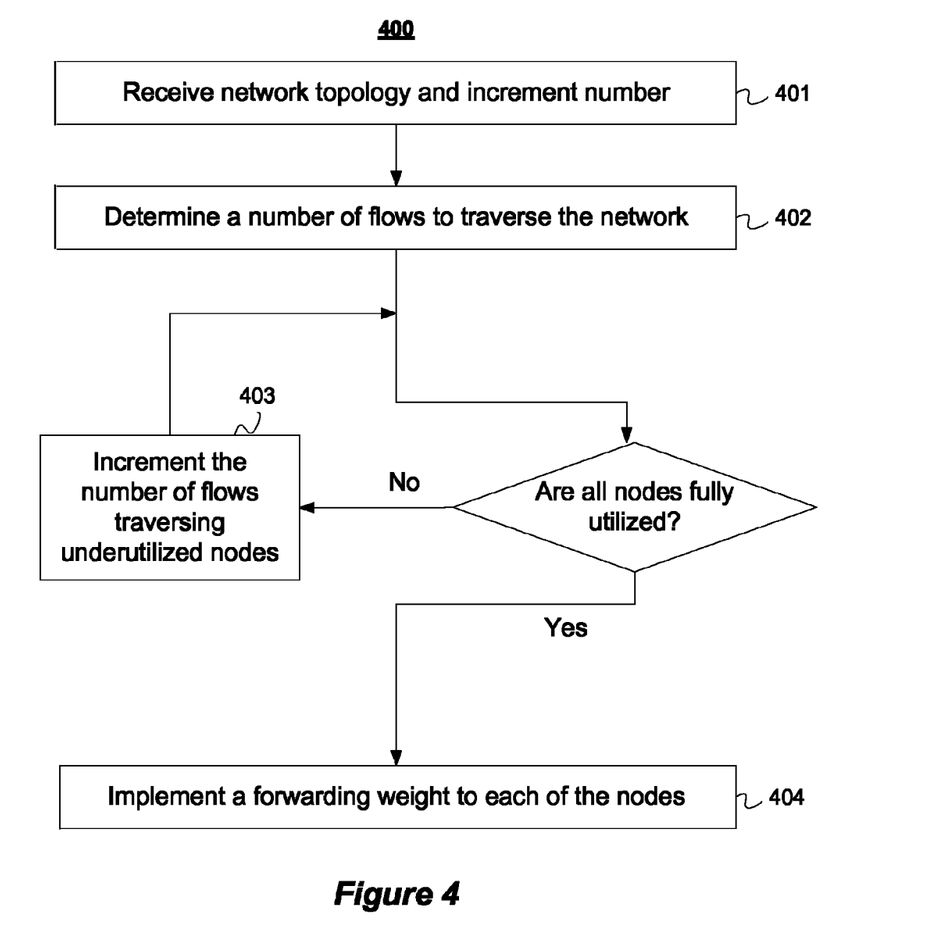
FIG. 4 is a flow chart of a method for reducing batch completion times with a per-destination max-min fairness scheme, according to an illustrative implementation.

FIG. 4 is a flow chart of a method 400 for reducing overall batch completion time by calculating forwarding weights that provide substantially fair transmission times for the flows of a batch. In general, forwarding weights can be calculated either by allocating flows from a source node to a path or by allocating raw data units to a path, regardless of which flow the data is associated with. The description of the method 400 provided herein assumes that such weights are determined based on allocations of flows to paths. However, based on such description, a person of ordinary skill in the art would appreciate how such a method could be implemented by allocating raw data units instead. Referring back to FIG. 4, the method 400 includes receiving a network topology and an increment number (step 401). Next, a number of flows to traverse the respective links of the network is determined (step 402). The number of flows traversing underutilized nodes is iteratively incremented (step 403) until all nodes are fully utilized. A forwarding weight is then calculated, and the forwarding weight is implemented on the network (step 404).

As set forth above, the method 400 begins with the receipt of a network graph and an increment size (step 401). The network graph is a logical representation of the network, and provides the flow routing system 200 information regarding the connections between the source nodes 302, switches 304, and destination node 306 (or similarly, the superblocks 102 and spineblocks 120 of the data center 100). For example, the network graph is data structure that provides the flow routing system 200 with information such as the network topology, bandwidth capacity of each link 308, and/or the paths over which flows traverse en route to the destination node 306. The increment size I is the amount a path's bandwidth allocation (in terms of number of flows) is increased with each iteration of the method 400. In some implementations, the flow routing system 200 obtains the increment size I by reading the increment size I from memory. In other implementations, the increment size I is provided to the flow routing system 200 by a system administrator of the data center 100. In yet other implementations, the flow routing system 200 determines the size of the increment number I by analyzing the bandwidth capacities of the links 308 in the network 300 and/or the number of flows traversing the network 300. In some implementations, a trade-off exists between the speed of the method 400 and its ability to substantially approximate the optimal forwarding weights. For example, a small increment size results in calculated forwarding weights that more closely approximate the optimal forwarding weight. However, the small value of the increment size I increases the number of iterations that must be performed to calculate a forwarding weight, thus slowing the process. Conversely, a large increment number I achieves a result quickly, but the large increment number I provides the system a poorer resolution for approximating the optimal forwarding weights. As a result, the increment number I can be selected, in part, based on how frequently the data allocations are going to be made and how important fair allocation of bandwidth is to the particular network environment.

The method 400 also includes obtaining an initial number of flows to traverse the respective links of the network (step 402). To track the number of flows allocated to each link, in some implementations, the flow routing system 200 maintains a set of virtual nodes and a set of virtual links. Virtual nodes and virtual links are logical representations of their physical counterparts. They are used to model the physical nodes and links to which they correspond. As used herein, the virtual links and virtual nodes include variable bandwidth capacities, which can in some instances exceed the actual physical capacity fo the actual nodes and links they correspond to. A virtual node is "connected" to each of the source nodes 302 of the network. The virtual nodes are connected to the source nodes 302 through correspond ones of the set of virtual links. In some implementations, each virtual link is initially allocated a capacity of I (i.e., the increment size).

Figure 5A:
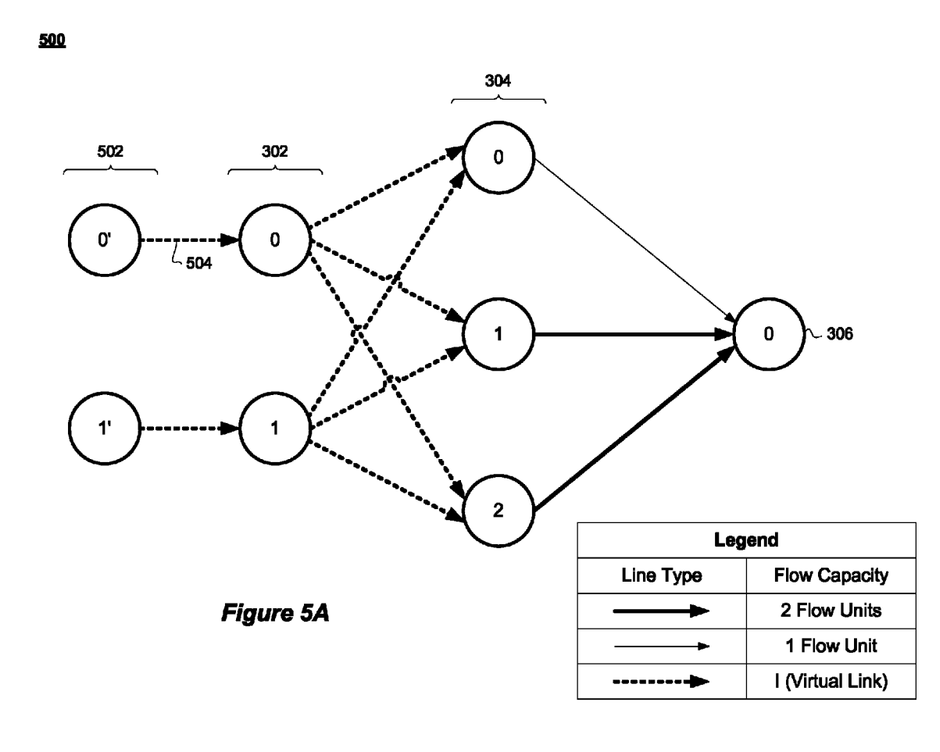
FIGS. 5A-5C are block diagrams of a network at various stages of the method of FIG. 4, according to an illustrative implementation.

FIG. 5A illustrates a network 500 corresponding to the network 300 of FIG. 2 with virtual nodes 502 [0'-1'] connected to the source nodes 302 [0-1] through virtual links 504[0-1]. In some implementations, the initial number of flows set to traverse the network 500 is determined by using the max-flow min-cut algorithm. The max-flow min-cut algorithm is based on the max-flow min-cut theorem that generally states that the maximum flow through a network equals the capacity of a cut that severs a source or sources (e.g., the source nodes 302) from the sink (e.g., destination node 306). In some implementations, the capacity of the min-cut of the network 500 is equal to I×N, where I is the increment size and N is the number of source nodes 302. For the network 500, the min-cut capacity is 2I. The max-flow min-cut algorithm is well known and is described, for example in the article "Maximal flow through a network" (Ford, L. R.; Fulkerson, D. R. (1956). Canadian Journal of Mathematics 8: 399-404.), the entirety of which is herein incorporated by reference.

Then, the number of flows configured to traverse any underutilized nodes is incremented (step 403). Prior to incrementing the number of flows traversing the nodes of the network 500, each node must be analyzed to determine if the node is underutilized. An underutilized node refers to a node that has the bandwidth capacity to transmit additional flows or data through the node. Inversely, a node is fully utilized when the number of flows or amount of data entering the node is greater than or equal to the number of flows or amount of data exiting the node. In some implementations, a node is underutilized because the link 308 (or virtual link 504) to the node is saturated and cannot support additional traffic. In some implementations, when incrementing the number of flows that traverse the underutilized nodes, the capacity of the link 308 (or virtual link 504) to the underutilized node is incremented. In some implementations, the capacity of the link 308 (or virtual link 504) to the underutilized node is incremented by the increment number I.

As described above, in some implementations, the number of flows traversing the network is iteratively incremented until each source node 302, switch 304, and/or link 308 of the network is fully utilized. During the iterative incrementation process, a node's allocation is not incremented once it becomes fully utilized.

Figure 5B:
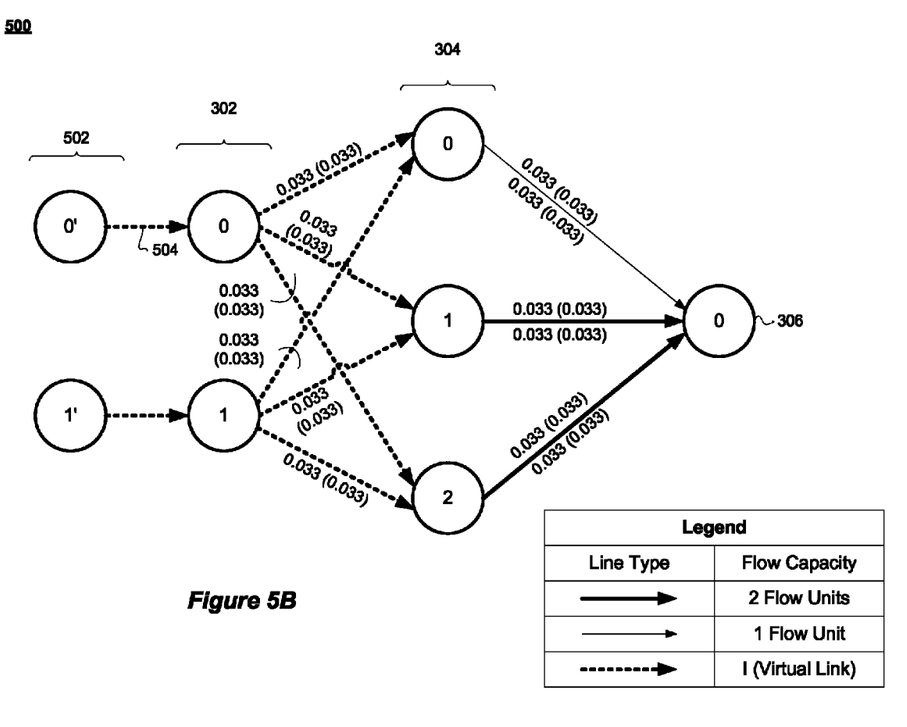

FIG. 5B illustrates the network 500 during the first iteration of the method 400. In this example, the increment number I=0.05 flow units. As described above, the max-flow min-cut algorithm provides a min-cut of 0.1 flow units (i.e., 2(I)=2 (0.05)=0.1) for the network 500, where N=2. At this stage of the method 400, 0.1 flow units traverse the network 500 from each virtual node 502. As each switch 304 is underutilized, the 0.1 flow units divides evenly among the three switches 304[0-2]. Accordingly, and as depicted in FIG. 5B, 0.033 flow units are allocated to traverse (and realized to traverse) each of the links 308 en route to the switches 304[0-2]. A total of 0.066 flow units (0.033+0.033) traverse each of the links 308 from the switches 304[0-2] to the destination node 306.

Figure 5C:
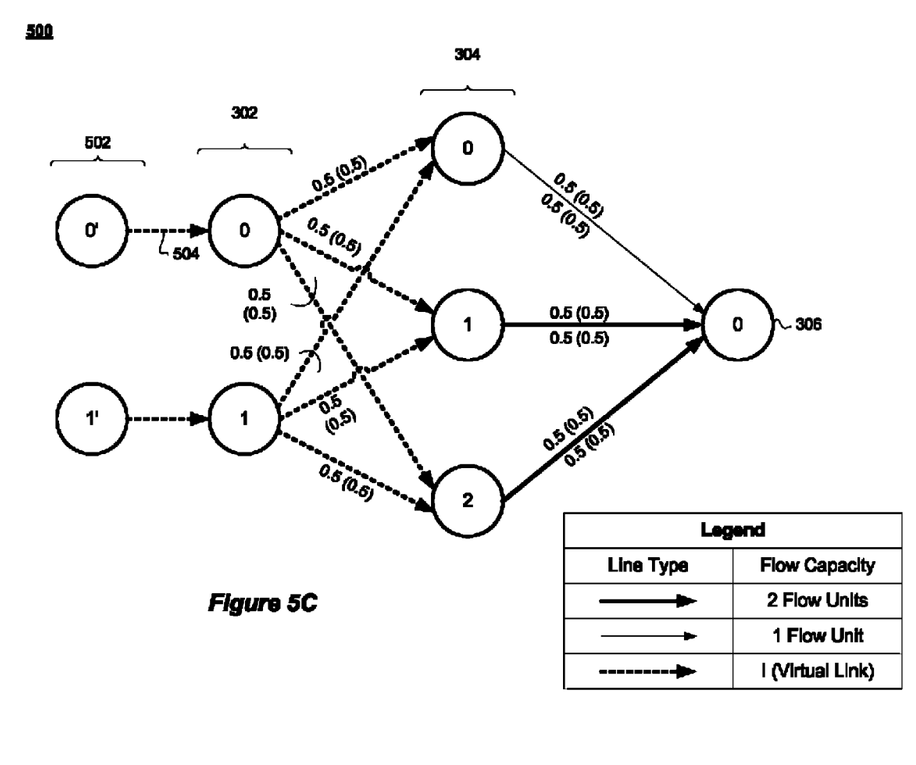

After fifteen iterations of the incrementation process, the max-flow min-cut algorithm provides a min-cut of 3 flow units (2(0.75)=1.5). The max-flow min-cut iteratively provided 0.1, 0.2, 0.3, etc flow units to traverse the network 500. FIG. 5C illustrates the network 500 at this stage in the method 400. As illustrated, 0.5 flow units is allocated to traverse (and realized to traverse) each of the switches 304 from the source nodes 302. At this point, switch 304[0] becomes saturated as a total of 1 flow unit enters switch 304[0] and a total of 1 flow unit exits switch 304[0]. The link 308 between the switch 304[0] and the destination node 306 has a total capacity of only 1 flow unit. Therefore, the throughput of switch 304[0] cannot be increased and the logical capacity of the virtual link to switch 304[0] is fixed to 0.5 flow units. As described above, the method 400 continues until the remaining network 500 components are saturated.

Next, a forwarding weight to each of the nodes is calculated and implemented (step 404). In some implementations, the forwarding weight for each node N (e.g., a source node 302) to each adjacent node M (e.g., each switch 304 connected to source node 302[N]) in the network is calculated by dividing the bandwidth allocation from node N to node M by the sum of the allocations provided to the neighbors of node N. Referring again to the network 500 of FIGS. 5A-5C, if an appropriately small increment number I was selected (e.g., I=0.05), after several iterations of the above described method steps, the bandwidth allocation from source node 302[0] to switch 304[0] would equal 0.5, the bandwidth allocation from source node 302[1] to switch 304[1] would equal 1, and the bandwidth allocation from source node 302[2] to switch 304[2] would equal 1. In this example, the forwarding weight from source node 302[0] to switch 304[0] equals 0.5/(0.5+1+1) =0.20. Similarly, the forwarding weight to switch 304[1] and switch 3042[2] from source node 302[0] is calculated and found to be 0.40. That is, the source node 302 [0] would transmit 20% of its flows intended for the destination node 306 through switch 304[0], 40% of its flows intended for the destination node 306 through switch 304[1], and 40% of its flows intended for the destination node 306 through switch 304[2].

Referring again to the step 304 of the method 400, next, each of the calculated forwarding weights are then implemented by the flow routing system 200. For example, in some implementations, the flow routing system 200 sets rate limiters at each of the nodes that cause flows to traverse the network 300 responsive to the calculated forwarding weights. In some other implementations, the flow routing system 200 sets the number of flows that each source node 302[0-1] transmits to each of the switches 304[0-2] with routing software installed in each of the switches 304[0-2].

In some implementations, the method 400 is repeated at regular intervals. For example, every hour, day or week. In other implementations, the method 400 is repeated responsive to detected changes in network traffic demands or patterns or to changes in the network topology. For example, when a new source node 302 and/or switch 304 is added to the network 300 or when the bandwidth capacity of a link 308 changes.

In FIGS. 5A-5C, the network 500 includes one node layer between the source nodes 302 and the destination node 306 (i.e., the one node layer of switches 304). In some implementations, the network 500 contains a plurality of node layers. The node layers can include additional switches 304 and/or additional superblocks 102. In implementations with multiple node layers between the source nodes 302 and destination node 306, the method 400 is repeated for each layer of nodes. For example, the forwarding weights to the first node layer are calculated and then the forwarding weights to the next node layer are calculated. In some of these implementations, there exists a plurality of routes a path can take from a source node 302 to the destination node 306. In these implementations, for the purpose of the max-flow min-cut algorithm the saturated nodes are still assumed to send flows through the network 500. This assumption allows the method 400 to continue without selecting a specific route through the network 500.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A system for determining routes for data flows across a network, the system comprising:
    a memory to store processor-executable instructions; and
    a processing unit coupled to the memory, wherein execution of the processor-executable instructions by the processing unit causes the processing unit to:
        receive a network topology of a plurality of data links that connect a plurality of source nodes to a plurality of second level nodes;
        determine a proportion of data to traverse over each of the plurality of data links from each of the respective plurality of source nodes by:
            maintaining, for each of the data links in the network, a corresponding virtual link;
            determining a throughput allocation for each of the virtual links;
            iteratively, until all of the second level nodes are fully utilized:
                identify a subset of the plurality of second level nodes having additional capacity; and
                increase the bandwidth capacity of the virtual links corresponding to the identified subset of the plurality of second level nodes; and
        implement a forwarding weight between each of the plurality of source nodes and each of the plurality of second level nodes in the network topology responsive to the determined proportion of the data allocated to each of the respective virtual links, wherein implementing the forwarding weight comprises at least one of selecting a path for each of a plurality of data flows and setting a flow rate limiter for each of the plurality of source nodes.

2. The system of claim 1, wherein the proportion of data to traverse over each of the plurality of data links comprises a proportion of a number of flows originating at the respective source nodes.

3. The system of claim 1, wherein the proportion of data to traverse over each of the plurality of data links comprises a proportion of the total amount of data associated with flows originating at the respective source nodes.

4. The system of claim 1, wherein the processor-executable instructions cause the processing unit to obtain a bandwidth increment number.

5. The system of claim 1, wherein the processor-executable instructions cause the processing unit to increase the capacity of the virtual links corresponding to the identified subset of the plurality of second level nodes by a bandwidth increment number.

6. The system of claim 5, wherein the virtual links have an initial capacity equal to the bandwidth increment number.

7. The system of claim 1, wherein the processor-executable instructions further cause the processing unit to create virtual nodes linked to each of the plurality of source nodes, wherein the virtual nodes are the source of the initial number of flows to traverse the network.

8. The system of claim 1, wherein the processor-executable instructions further cause the processing unit to determine the throughput allocation using a max-flow min-cut algorithm.

9. A computer-implemented method for determining routes for data flows across a network, the method comprising:
- receiving a network topology of a plurality of data links that connect a plurality of source nodes to a plurality of second level nodes;
- determining a proportion of data to traverse over each of the plurality of data links from each of the respective plurality of source nodes by:
  - maintaining, for each of the data links in the network, a corresponding virtual link;
  - determining a throughput allocation for each of the virtual nodes/links;
  - iteratively, until all of the second level nodes are fully utilized:
    - identifying a subset of the plurality of second level nodes having additional capacity; and
    - increasing the bandwidth capacity of the virtual links corresponding to the identified subset of the plurality of second level nodes; and
- implementing a forwarding weight between each of the plurality of source nodes and each of the plurality of second level nodes in the network topology responsive to the determined proportion of the data allocated to each of the respective virtual links, wherein implementing the forwarding weight comprises at least one of selecting a path for each of a plurality of data flows and setting a flow rate limiter for each of the plurality of source nodes.

10. The method of claim 9, wherein the proportion of data to traverse over each of the plurality of data links comprises a proportion of a number of flows originating at the respective source nodes.

11. The method of claim 9, wherein the proportion of data to traverse over each of the plurality of data links comprises a proportion of the total amount of data associated with flows originating at the respective source nodes.

12. The method of claim 9, further comprising obtaining a bandwidth increment number.

13. The method of claim 9, wherein increase the capacity of the virtual links corresponding to the identified subset of the plurality of second level nodes by a bandwidth increment number.

14. The method of claim 9, further comprising increasing creating virtual nodes linked to each of the plurality of source nodes, wherein the virtual nodes are the source of the initial number of flows to traverse the network.

15. The method of claim 14, wherein the virtual links have an initial capacity equal to the bandwidth increment number.

16. The method of claim 9, further comprising determining determine the throughput allocation using a max-flow min-cut algorithm.

17. A non-transitory computer readable storage medium having instructions encoded thereon which, when executed by a processor, cause the processor to perform a method for determining routes for data flows across a network, the method comprising:
- receiving a network topology of a plurality of data links that connect a plurality of source nodes to a plurality of second level nodes;
- determining a proportion of data to traverse over each of the plurality of data links from each of the respective plurality of source nodes by:
  - maintaining, for each of the data links in the network, a corresponding virtual link;
  - determining a throughput allocation for each of the virtual nodes/links;
  - iteratively, until all of the second level nodes are fully utilized:
    - identifying a subset of the plurality of second level nodes having additional capacity; and
    - increasing the bandwidth capacity of the virtual links corresponding to the identified subset of the plurality of second level nodes; and
- implementing a forwarding weight between each of the plurality of source nodes and each of the plurality of second level nodes in the network topology responsive to the determined proportion of the data allocated to each of the respective virtual links, wherein implementing the forwarding weight comprises at least one of selecting a path for each of a plurality of data flows and setting a flow rate limiter for each of the plurality of source nodes.

18. The non-transitory computer readable storage medium of claim 17, wherein the method further comprises obtaining the initial number of flows to traverse from each of the plurality of source nodes to the destination node using a max-flow min-cut algorithm.

19. The non-transitory computer readable storage medium of claim 17, wherein the proportion of data to traverse over each of the plurality of data links comprises a proportion of a number of flows originating at the respective source nodes.

20. The non-transitory computer readable storage medium of claim 17, wherein the proportion of data to traverse over each of the plurality of data links comprises a proportion of the total amount of data associated with flows originating at the respective source nodes.

* * * * *